(12) United States Patent
Gaonkar et al.

(10) Patent No.: US 9,383,943 B2
(45) Date of Patent: *Jul. 5, 2016

(54) MAPPING OF LOGICAL START ADDRESSES TO PHYSICAL START ADDRESSES IN A SYSTEM HAVING MISALIGNMENT BETWEEN LOGICAL AND PHYSICAL DATA BLOCKS

(71) Applicant: NetApp, Inc., Sunnyvale, CA (US)

(72) Inventors: Shravan Gaonkar, Sunnyvale, CA (US); Rahul Narayan Iyer, Sunnyvale, CA (US); Deepak Kenchammana-hosekote, San Jose, CA (US)

(73) Assignee: NETAPP, INC., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/043,580

(22) Filed: Oct. 1, 2013

(65) Prior Publication Data

US 2014/0181239 A1    Jun. 26, 2014

Related U.S. Application Data

(63) Continuation of application No. 12/608,901, filed on Oct. 29, 2009, now Pat. No. 8,578,126.

(51) Int. Cl.
*G06F 12/00* (2006.01)
*G06F 3/06* (2006.01)

(52) U.S. Cl.
CPC ............. *G06F 3/0665* (2013.01); *G06F 3/061* (2013.01); *G06F 3/064* (2013.01); *G06F 3/0607* (2013.01); *G06F 3/067* (2013.01); *G06F 3/0689* (2013.01)

(58) Field of Classification Search
CPC ...... G06F 3/0665; G06F 3/0689; G06F 3/064
See application file for complete search history.

(56) References Cited

U.S. PATENT DOCUMENTS

| | | | | |
|---|---|---|---|---|
| 6,704,833 | B2* | 3/2004 | Huck | 711/3 |
| 7,296,135 | B2* | 11/2007 | Thompson | 711/201 |
| 8,180,736 | B2 | 5/2012 | Schneider | |
| 2010/0185830 | A1* | 7/2010 | Asnaashari et al. | 711/206 |
| 2011/0099350 | A1* | 4/2011 | Feldman et al. | 711/209 |

OTHER PUBLICATIONS

Notice of Allowance Mailed Jul. 1, 2013. U.S. Appl. No. 12/608,901, filed Oct. 29, 2009.

* cited by examiner

*Primary Examiner* — Kevin Verbrugge
*Assistant Examiner* — Alan Otto (57) ABSTRACT

An alignment data structure is used to map a logical data block start address to a physical data block start address dynamically, to service a client data access request. A separate alignment data structure can be provided for each data object managed by the storage system. Each such alignment data structure can be stored in, or referenced by a pointer in, the inode of the corresponding data object. A consequence of the mapping is that certain physical storage medium regions are not mapped to any logical data blocks. These unmapped regions may be visible only to the file system layer and layers that reside between the file system layer and the mass storage subsystem. They can be used, if desired, to store system information, i.e., information that is not visible to any storage client.

20 Claims, 8 Drawing Sheets

MAPPING OF LOGICAL START ADDRESSES TO PHYSICAL START ADDRESSES IN A SYSTEM HAVING MISALIGNMENT BETWEEN LOGICAL AND PHYSICAL DATA BLOCKS

CROSS-REFERENCE TO RELATED APPLICATION

This application is a continuation of U.S. patent application Ser. No. 12/608,901, entitled "USING LOGICAL BLOCK ADDRESSES WITH GENERATION NUMBERS AS DATA FINGERPRINTS FOR NETWORK DEDUPLICATION", which was filed on Oct. 29, 2009, which is incorporated by reference herein in its entirety.

FIELD OF THE INVENTION

At least one embodiment of the present invention pertains to data storage systems, and more particularly, to a technique for mapping logical start addresses to physical start addresses in a system that has misalignment between logical and physical data blocks.

BACKGROUND

Network based storage, or simply "network storage", is a common approach to backing up data, making large amounts of data accessible to multiple users, and other purposes. In a network storage environment, a storage server makes data available to client (host) systems by presenting or exporting to the clients one or more logical containers of data. There are various forms of network storage, including network attached storage (NAS) and storage area networks (SANs). In a NAS context, a storage server services file-level requests from clients, whereas in a SAN context a storage server services block-level requests. Some storage servers are capable of servicing both file-level requests and block-level requests.

A storage server typically manages one or more file systems. A "file system" is a structured (e.g., hierarchical) set of stored logical containers of data (e.g., volumes, logical units (LUNs), directories, files). A file system does not have to include or be based on "files" per se, however; it can be based on a different type of storage unit, such as LUNs, for example. In a typical file system, data is stored in blocks, where a "block" is the smallest unit of contiguous user data that the file system stores. However, a storage server may provide one or more levels of storage virtualization, in which case the physical data blocks (i.e., the blocks stored on the physical storage media) are represented by corresponding logical blocks in the storage server. Clients of the storage server may be aware of the logical blocks, but are generally not aware that the logical blocks are virtualizations of physical blocks.

A problem that affects certain file systems, particularly those used by or with virtual machines, is misalignment between logical blocks and physical blocks, i.e., "block misalignment". In most file systems that exist today, the size of the logical data blocks in the file system is a multiple of a common disk sector size, 512 bytes. For example, common sizes of logical blocks in a file system are 4 KB (eight sectors) and 8 KB (16 sectors). A virtual machine file system is generally implemented as one or more virtual hard disks. A virtual hard disk is typically implemented as a file in a real (non-virtualized) file system. A virtual machine file system is often called a "guest file system", whereas the non-virtualized (conventional) file system on which it is implemented is called the "host file system".

Figure 1:
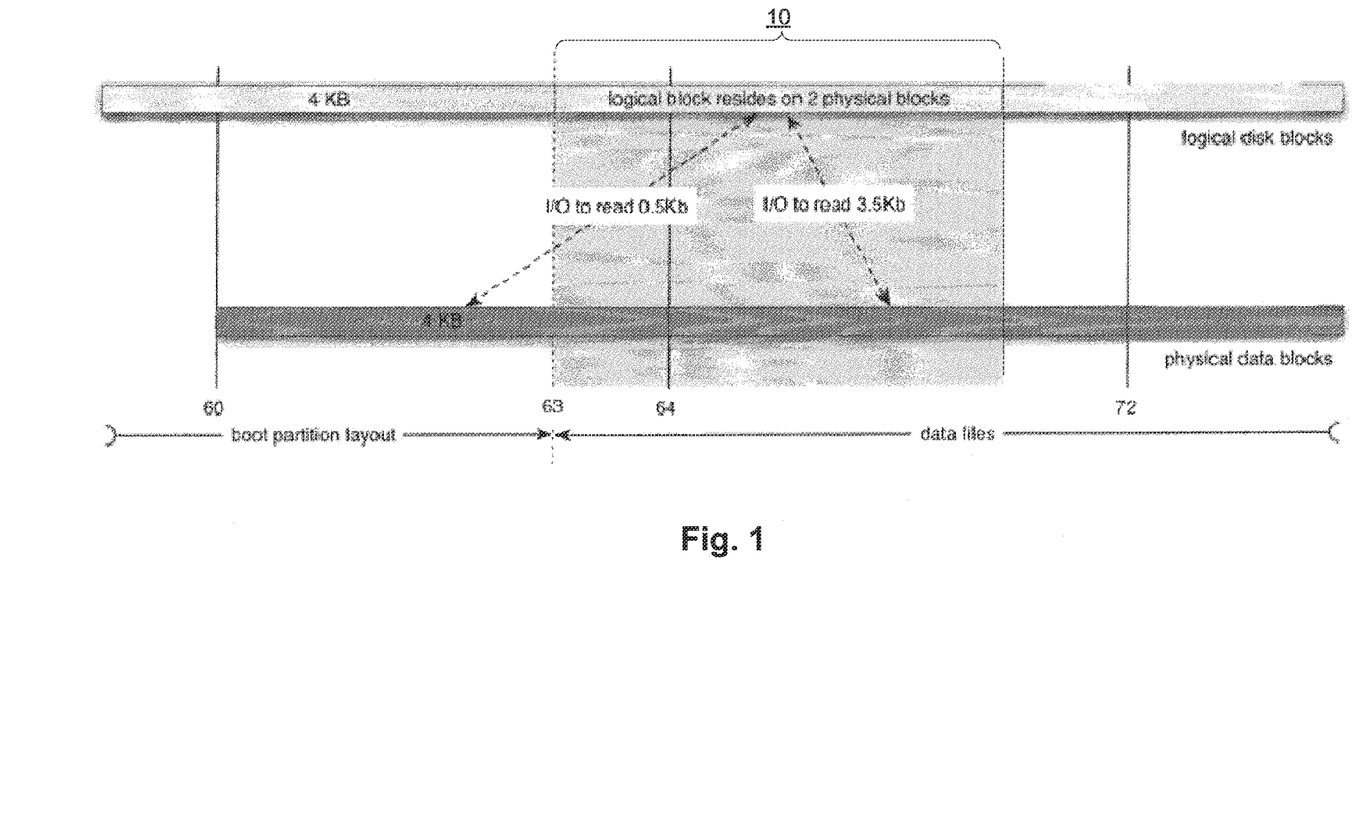
FIG. 1 illustrates an example of block misalignment.

Now to understand the misalignment problem, consider the following. Disks typically store 63 sectors of system metadata, such as a master boot record (MBR), partition table, etc., which occupy sector numbers 0 through 62, as shown in FIG. 1. This system metadata is sometimes called the "boot partition layout". In FIG. 1, the top horizontal band represents the logical blocks in a file system while the bottom horizontal band represents the corresponding physical (on disk) blocks. User data storage begins at sector 63 on disk. Accordingly, the physical storage space allocated for the first logical block starts at sector 63 and ends with sector 70.

A virtual disk, which is a file representing a disk, also stores the above-mentioned system metadata. If the physical disks have 512 byte sectors, then this system metadata is (63 sectors)*(512 bytes-per-sector)=32,256 bytes long. Since a virtual disk is stored on the host filesystem, it utilizes 32,256/4,096=7.875 host file system blocks, assuming the host file system uses 4 KB blocks. In other words, the system metadata of the virtual disk occupies seven full host filesystem blocks (56 sectors*512 bytes/4K=7) and 7*512=3,584 bytes of the eighth host filesystem block.

Further, because the MBR, partition table, and other system metadata fill disk sectors 0 through 62, block 0 of the guest filesystem in the virtual disk starts at an offset of 63*512=32,256 bytes in the virtual disk file. Yet inconveniently, that offset is at byte 3,584 in the eighth host filesystem block, as explained above. Consequently, when the guest file system reads a 4 KB chunk of data (it will read multiples of 4 KB if its block size is 4 KB), the 4 KB being read is from the last 512 bytes of the eighth host file system block and the first 3,584 bytes of the ninth host file system block, as illustrated in FIG. 1. Thus, even though the host and guest file systems have the same block size, their starting offsets are not aligned. This situation is block misalignment.

A result of block misalignment is that two reads from disk are required to read a single guest file system block, causing a slowdown in performance. Similarly, to write a guest file system block, two reads from disk and two writes to disk would be required. In FIG. 1, a guest file system read of a particular logical block 10 actually requires two separate reads at the disk level: The first would be to read the last 0.5 KB of the eighth contiguous block on disk (i.e., sector 63), and the second would be to read the first 3.5 KB of the ninth contiguous block on disk (i.e., sectors 64-70). The shaded band in FIG. 1 shows how, for a given file, a logical block 10 actually corresponds to two different physical blocks, due to block misalignment.

Existing storage systems deal with block misalignment, if at all, by temporarily taking the file system off-line, realigning the misaligned blocks by using a special software tool, and then bringing the storage system back online. However, taking a storage system off-line for any length of time and for any reason may be undesirable, particularly in large-scale, enterprise-class network storage systems that handle mission-critical data and backup functions and are relied upon by hundreds or thousands of users.

SUMMARY

The technique introduced here creates an alignment map, which is a data structure that can be used to map a logical data block start address to a physical data block start address dynamically (i.e., in response to a client data access request) to service a client data access request. A separate alignment map can be provided for each data object managed by the storage system. Each such alignment map can be stored in, or referenced by a pointer in, the inode of the corresponding data object.

A consequence of the mapping is that certain physical storage medium regions (e.g., disk sectors) are not mapped to any logical data blocks. In certain embodiments these unmapped regions are only visible to the file system layer and layers that reside between the file system layer and the mass storage subsystem. They can be used, if desired, to store system information, i.e., information that is not visible to any storage client.

An advantage of this technique is that it avoids the necessity of having to take the system off-line to fix data block misalignment. Rather, the system operates correctly even when data block misalignment exists. In addition, each logical block can be read by a single read from disk, so performance is not negatively impacted by block misalignment. Furthermore, the technique enables arbitrary modification of the physical offsets of data at any time, thus facilitating on-demand data object migration. The technique introduced here can be used to avoid the problems that would otherwise result from block misalignment in, for example, a virtual file system in a virtual machine environment.

Other aspects of the technique will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

Figure 2:
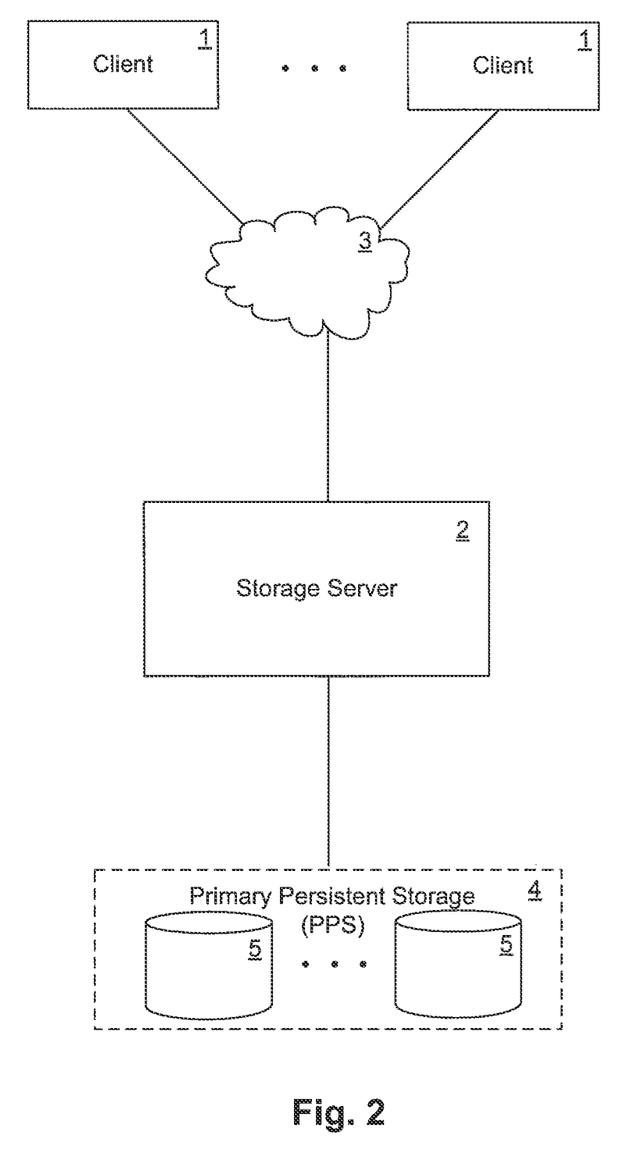
FIG. 2 illustrates a network storage environment in which the technique introduced here can be implemented.

FIG. 2 illustrates an environment in which the technique can be employed. In FIG. 2, a network storage server 2 is coupled to a primary persistent storage (PPS) subsystem 4 and is also coupled to a set of storage clients 1 through an interconnect 3. The interconnect 3 may be, for example, a local area network (LAN), wide area network (WAN), metropolitan area network (MAN), global area network such as the Internet, a Fibre Channel fabric, or any combination of such interconnects. Each of the clients 1 may be, for example, a conventional personal computer (PC), server-class computer, workstation, handheld computing/communication device, or the like.

Storage of data in the PPS subsystem 4 is managed by the storage server 2. The storage server 2 receives and responds to various read and write requests from the clients 1, relating to data stored in or to be stored in the storage subsystem 4. The PPS subsystem 4 includes a number of nonvolatile mass storage devices 5, which can be, for example, conventional magnetic or optical disks or tape drives; alternatively, they can be non-volatile solid-state memory, such as flash memory, or any combination of such devices. It is assumed that the mass storage devices 5 in PPS subsystem 4 are organized into one or more RAID groups, and the storage server 2 accesses the storage subsystem 4 using a RAID algorithm for redundancy (e.g., RAID-4, RAID-5 or RAID-DP).

The storage server 2 may provide file-level data access services to clients 1, as is commonly provided in a NAS environment, or block-level data access services as is commonly provided in a SAN environment, or it may be capable of providing both file-level and block-level data access services to clients 1. Further, although the storage server 2 is illustrated as a single unit in FIG. 1, it can have a distributed architecture. For example, the storage server 2 can be implemented as a physically separate network module (e.g., "N-blade") and disk module (e.g., "D-blade") (not shown), which communicate with each other over a physical interconnect. Such an architecture allows convenient scaling, such as by deploying two or more N-modules with two or more D-modules, all communicating with each other through the interconnect.

Figure 3:
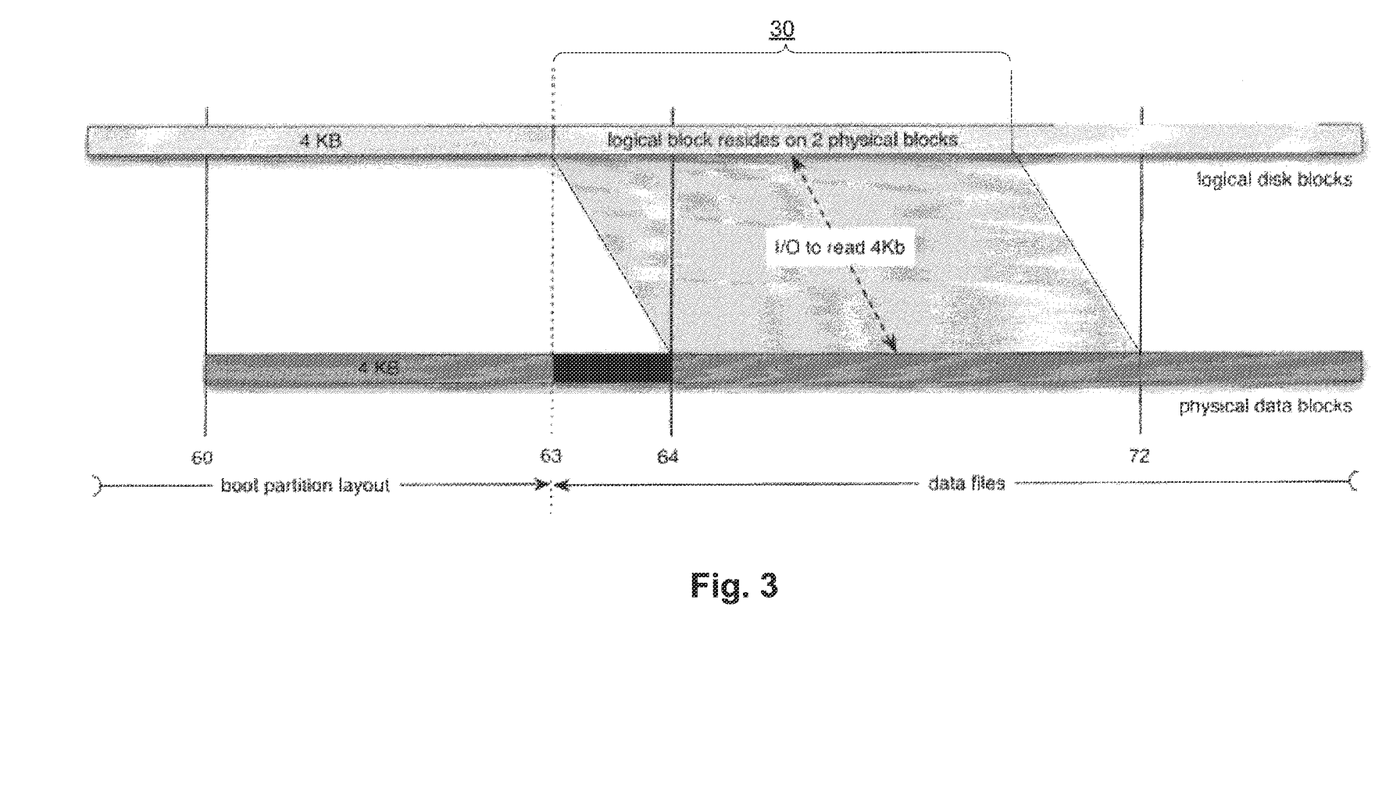
FIG. 3 shows an example of block misalignment in accordance with the technique introduced here.

FIG. 3 illustrates an example of the technique introduced here. The technique uses a data structure called an "alignment map" (not shown in FIG. 3 but discussed in detail below) to map logical start addresses (offsets) of data blocks to physical start addresses (offsets) of the data blocks. In that sense, the alignment map can also be referred to as an "offset directory". The start address (offset) of each logical block of each file (or other data container, e.g., LUN) in a file system is mapped, by using the alignment map, to the correct on-disk offset, and this mapping can be used in real time to service client requests.

As in the example discussed above, data files begin at sector 63 on disk. However, in the example of FIG. 3, the start address of the logical block 30 of data is mapped to sector 64 by use of the above-mentioned alignment map. The logical block 30 resides on two different physical blocks as in the above example, however, the mapping allows the logical block 30 to be read by using a single read from disk, in contrast with the prior approach which required two reads from disk.

A consequence of this mapping scheme is that certain disk sectors are not mapped to any logical data blocks, such as physical sector 63 in the illustrated example. In one embodiment these sectors are only visible to the file system layer and layers that reside between the file system layer and the PPS subsystem 4. They can be used, if desired, to store system information, i.e., information that is not visible to any storage client. As just one example, these unmapped sectors can be used to store information related quality of service. More specifically, the storage system can store access characteristics of ranges of blocks in these unmapped sectors. Storing metadata such as this in the unmapped sectors is more efficient to read and write, since it is in the disk path of the actual data.

For purposes of handling block misalignment, it will generally be sufficient to support just a small number of these unmapped sectors, e.g., less than 10; this is because in practice it is rare for more than four disk partitions to be used in a given system. Also, in a virtual environment, users might simply create multiple disk images to map each partition.

Another advantage of this technique is that it avoids having to take the system off-line to detect or fix data block misalignment. Rather, the system operates correctly even when data block misalignment exists. Furthermore, the technique enables arbitrary modification of the physical offsets of data at any time, thus facilitating on-demand data object migration. As long as the alignment map of each affected data object is also modified to reflect any offset modifications, the system will still operate correctly.

In this technique a separate alignment map can be provided for each file (or whatever other type of data object the file system manages). The alignment map for a given file can be created when the file is created or at any convenient time thereafter, such as when block misalignment is detected. Note that the particular method used to detect block misalignment is not germane to technique introduced here and need not be described herein. Techniques for detecting block misalignment are well-known in the art, and any known or convenient technique for detecting block misalignment can be employed in conjunction with the technique introduced here.

Figure 4:
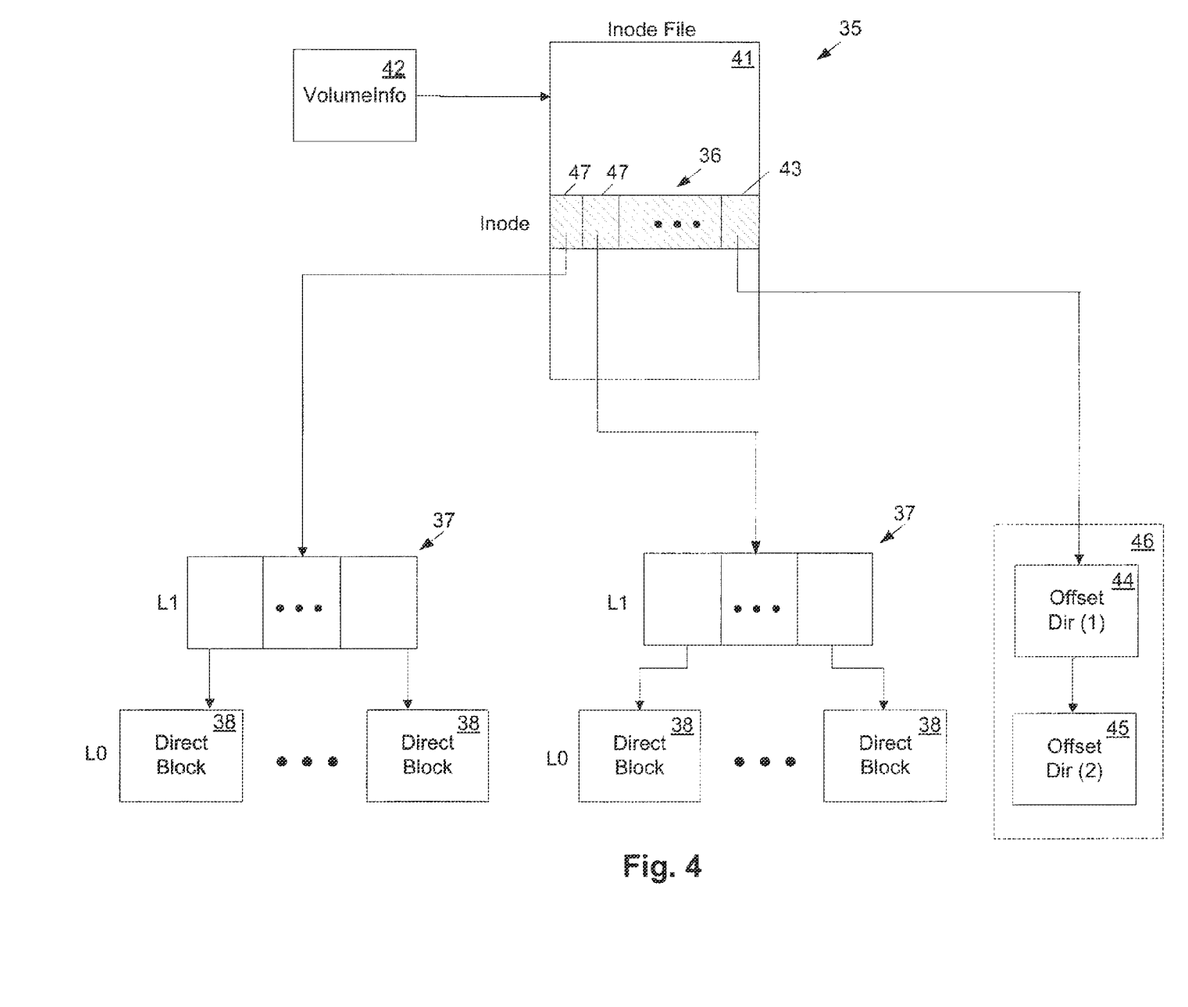
FIG. 4 illustrates an example of a buffer tree of a data object.

Before further discussing the technique introduced here, it is useful to consider how a file system can be structured, in at least some embodiments. A file system typically includes one or more volumes. A "volume" is a logical data set which is an abstraction of physical storage, combining one or more physical mass storage devices (e.g., disks) or parts thereof into a single logical storage object, and which is managed as a single administrative unit. A volume can include one or more files. As shown in FIG. 4, every file is represented by a separate inode 36, which is stored in an inode file 41 associated with the volume that contains the file. The location of the inode file 41 for each volume is stored in a Volume Information ("VolumeInfo") block 42 associated with that volume. The VolumeInfo block 42 is a metadata container that contains metadata that applies to the volume as a whole.

An "inode" is a special type of data block that contains metadata about the data object (e.g., file) that it represents and is the root of a hierarchical structure 35, called a "buffer tree", of blocks that make up the data object. A given data object such as a file is, therefore, stored in the form of a buffer tree 35, the root of which is the data object's inode 36, and which typically includes a number of "indirect" blocks 37, and a number of lowest-level blocks (also called "direct blocks" or "level-0" blocks) 38 that contain the actual user data. Each indirect block 37 points to one or more direct blocks 38 or to one or more lower-level indirect blocks (not shown). The metadata in an inode 36 can include, for example, the inode number of the data object (a unique identifier of the inode), the type of data object which the inode represents (e.g., file, LUN, directory); ownership of the data object, access permissions for the data object, and size of the data object. An inode 36 also includes pointers 47 to blocks in the next lower level of blocks, e.g., indirect blocks 37 in the example of FIG. 4.

In accordance with the technique introduced here, in one embodiment a predesignated pointer 43, of the pointers in the inode 36, is used to point to the alignment map 46 for the file (or other data object) that the inode 36 represents. Alternatively, the alignment map 46 can be stored within the inode itself if the alignment map is small enough. The alignment map 46 stores either the on disk start addresses of the logical blocks in the file, or information from which such start addresses can be quickly derived at runtime, as discussed further below. A special flag (e.g., a predetermined bit) can be included in the inode 36 to indicate whether the file has an alignment map 46, e.g., to indicate that pointer 43 is a pointer to an alignment map 46 and not a regular indirect or direct block.

On disk (e.g., in PPS subsystem 4), the alignment map 46 can be stored in the form of a linked list of blocks, represented for example in FIG. 4 by blocks 44 and 45. However, it may be advantageous to represent the alignment map 46 in a different form when it is loaded into main memory in the storage server 2, such as in the form of a balanced binary tree (BBT), to facilitate faster search and location of values in the alignment map 46.

As noted above, the mapping results in certain on disk (physical) sectors not being mapped to any logical blocks. Since the size of an unmapped sector is always less than the size of a physical data block, the end address of any unmapped sector is easily determined: It will always be the next address that is divisible by the physical block size (e.g., 4 KB), implying the end of the physical block. Therefore, it is not necessary to maintain the end addresses of unmapped sectors.

Figure 5:
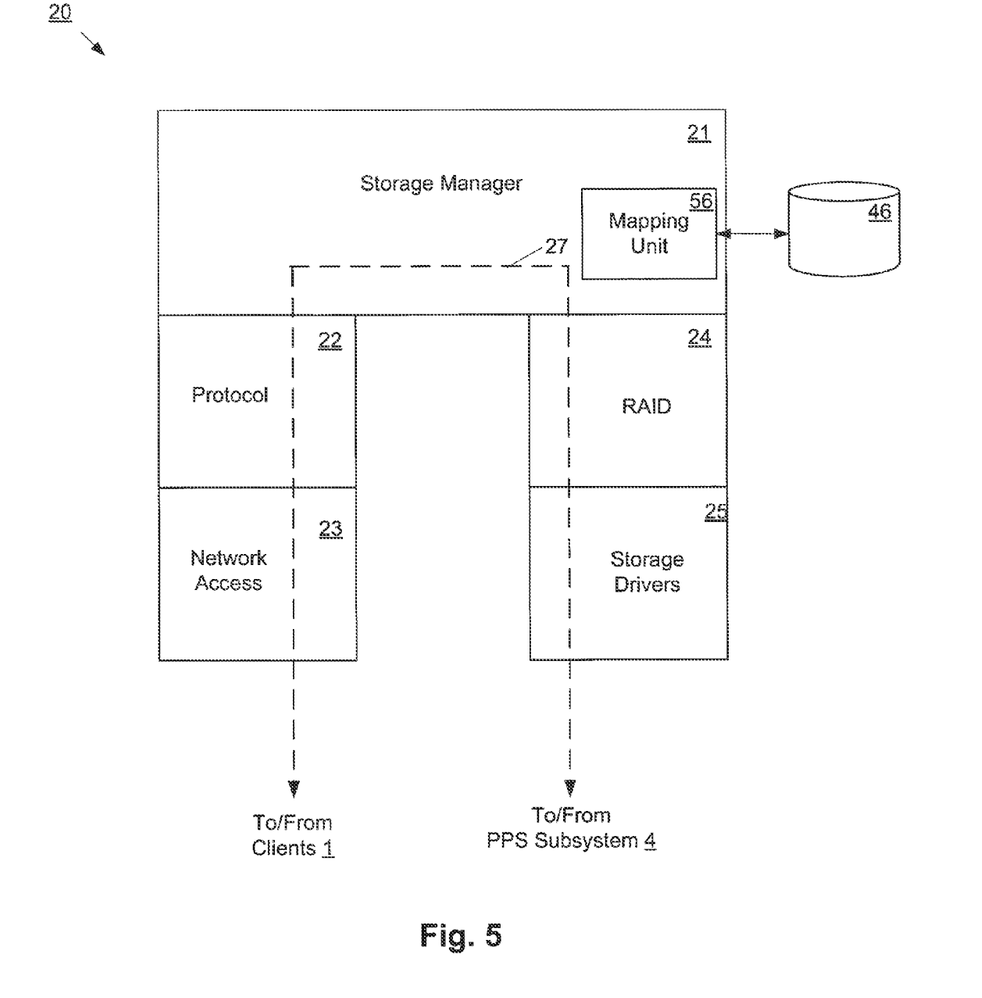
FIG. 5 illustrates an example of the architecture of the storage operating system of a storage server.

The storage server 2 includes a storage operating system for use in controlling its basic operations (e.g., reading and writing data in response to client requests). FIG. 5 schematically illustrates an example of the architecture of the storage operating system in the storage server 2. The storage operating system 20 can be implemented as programmable circuitry programmed with software and/or firmware, or as specially designed (non-programmable) circuitry, or a combination thereof. In the illustrated embodiment, the storage operating system 20 includes several modules, or "layers". These layers include a storage manager 21, which is the core functional element of the storage operating system 20. The storage manager 21 imposes a structure (e.g., one or more file systems) on the data managed by the storage server 2 and services read and write requests from clients 1.

To allow the storage server 2 to communicate over the network 3 (e.g., with clients 1), the storage operating system 20 also includes a protocol layer 22 and a network access layer 23, logically "under" the storage manager 21. The protocol 22 layer implements various higher-level network protocols, such as Network File System (NFS), Common Internet File System (CIFS), Hypertext Transfer Protocol (HTTP), Internet small computer system interface (iSCSI), and/or backup/mirroring protocols. The network access layer 23 includes one or more network drivers that implement one or more lower-level protocols to communicate over the network, such as Ethernet, Internet Protocol (IP), Transport Control Protocol/Internet Protocol (TCP/IP), Fibre Channel Protocol (FCP) and/or User Datagram Protocol/Internet Protocol (UDP/IP).

Also, to allow the storage server 2 to communicate with the persistent storage subsystem 4, the storage operating system 20 includes a storage access layer 24 and an associated storage driver layer 25 logically under the storage manager 21. The storage access layer 24 implements a higher-level disk storage redundancy algorithm, such as RAID-4, RAID-5 or RAID-DP and, therefore, is henceforth referred to as "RAID layer 24" to facilitate description. The storage driver layer 25 implements a lower-level storage device access protocol, such as Fibre Channel Protocol (FCP) or small computer system interface (SCSI).

Also shown in FIG. 5 is the path 27 of data flow through the storage operating system 20, associated with a read or write operation, from the client interface to the PPS interface. Thus, the storage manager 21 accesses the PPS subsystem 4 through the storage access layer 24 and the storage driver layer 25.

The storage operating system 20 can have a distributed architecture. For example, the protocol layer 22 and network access layer 23 can be contained in an N-module (e.g., N-blade) while the storage manager 21, storage access layer 24 and storage driver layer 25 are contained in a separate D-module (e.g., D-blade). In such cases, the N-module and D-module communicate with each other (and, possibly, with other N- and D-modules) through some form of physical interconnect and collectively form a storage server node. Such a storage server node may be connected with one or more other storage server nodes to form a highly scalable storage server cluster.

In accordance with the technique introduced here, the storage manager 21 also includes a mapping unit 56, which creates, manages and uses the above-mentioned alignment map 46. A separate alignment map 46 may be created for each individual file (or other type of storage unit) maintained by the storage manager 21.

Figure 6:
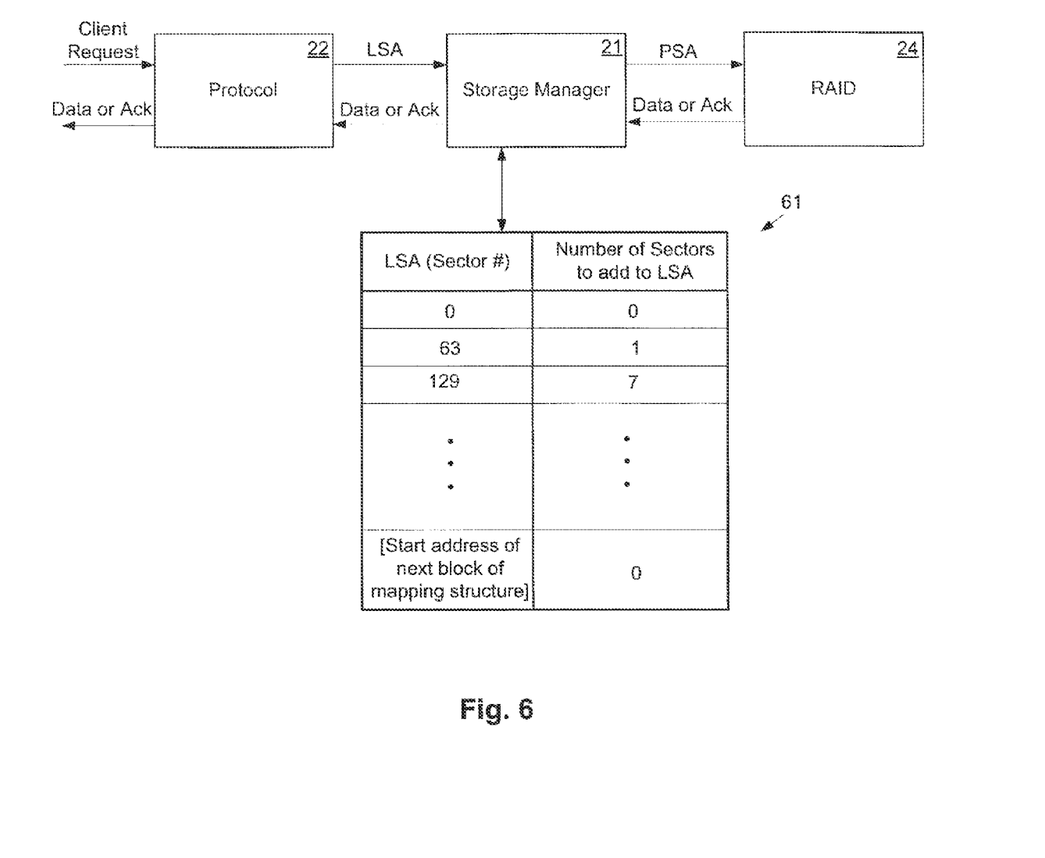
FIG. 6 illustrates an example of the alignment map in greater detail.

FIG. 6 illustrates an example of the alignment map 46 and the manner in which it can be used. In the illustrated embodiment, the alignment map 46 is implemented as a table 61, which can be stored on disk as one or more data blocks, e.g., as a linked list. The table 61 includes a set of key-value pairs, where the left-hand column contains the keys and the right-hand column contains the corresponding values. Each key is the start address of a logical block of the file, i.e., a logical start address (LSA), which can be a disk sector number, for example. The corresponding value is the number of sectors to add to the LSA to get the correct on-disk start address of the logical block. For example, the value for LSA 0 in the alignment map 46 is 0, because no adjustment needs to be made to that LSA (because it is assumed that sectors 0-62 are unavailable for user data). On the other hand, the value corresponding to LSA 63 is 1, indicating that the actual on disk start address, i.e., the physical start address (PSA) of the logical block having LSA 63 is sector 64 (63+1). As noted above, the alignment map 46 can be implemented on disk as a linked list of blocks (e.g., 4 KB blocks). Accordingly, the last value in a particular block of the alignment map is either the address of the next block in the linked list, or "0" if the particular block is the last or only block in the alignment map 46. Note that these specific LSAs and corresponding values are examples only.

It may be desirable to reduce the amount of storage needed for the alignment map 46. Accordingly, in an alternative embodiment, the alignment map 46 stores only LSAs. This is possible in a system where the alignment boundary is well-known (i.e., the block size is well-known) and where for each LSA, the amount to be added to get the corresponding PSA can be computed deterministically. For example, let the value X equal the number of sectors in each block on disk. In that case, the amount to be added to each LSA to get the PSA can be expressed deterministically as X-(LSA modulo X). In that case, only the LSA is needed to compute the PSA. This reduces the amount of storage needed for the alignment map 46 by one half. In any case, the PSA can be computed dynamically, i.e., in response to a client data access request.

Figure 7:
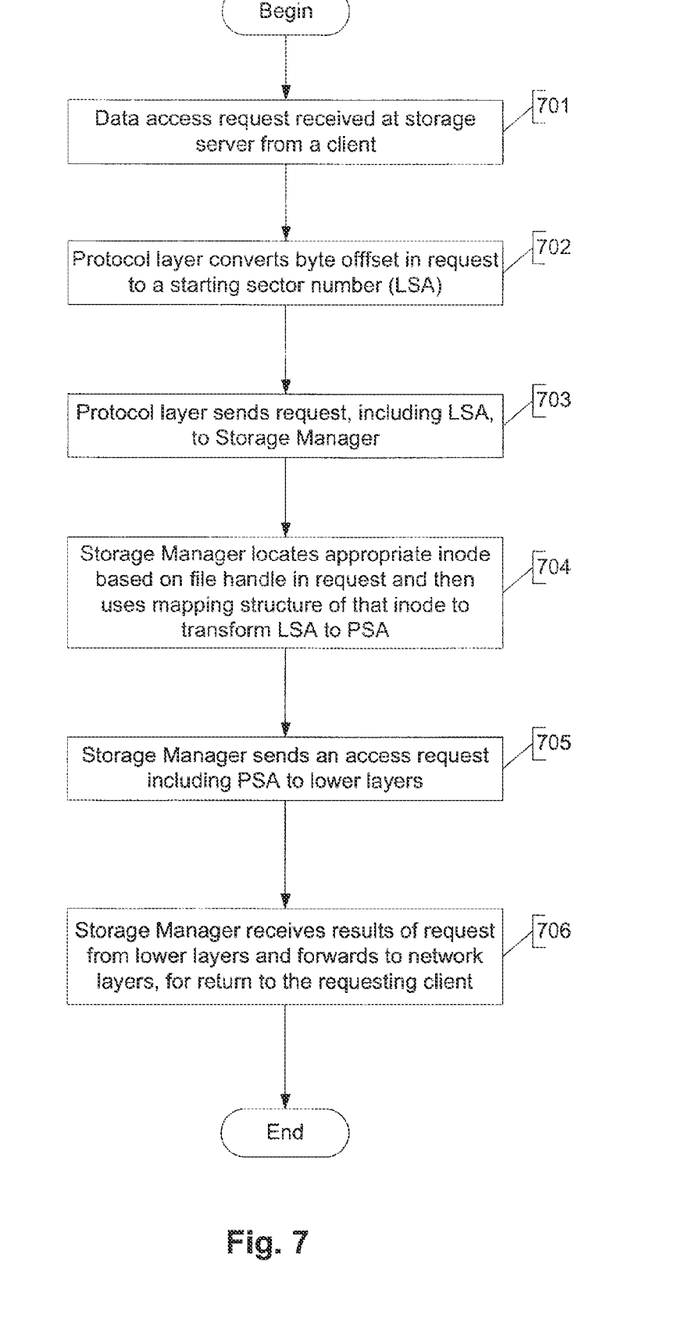
FIG. 7 is a flow diagram of a process for handling a client data access request by using the alignment map.

FIG. 7 illustrates an example of a process of using the alignment map 46 in response to a client request. Refer also to FIG. 6 in this regard. Initially, at 701 the storage server 2 receives a data access request from a client 1, such as a read or write request. The case of an NFS read request is assumed here as an example, to facilitate explanation. In the case of an NFS read request, the request includes the byte offset of the first byte to be read, and the number of blocks to be read. At 702, therefore, the protocol layer 22 in the storage server 2 (or more specifically an NFS sublayer of the protocol layer 22) converts the byte offset in the request to a corresponding LSA (e.g., a starting sector number), using any known or convenient technique. The protocol layer 22 then sends the request, including the LSA, to the storage manager 21 at 703. At 704 the storage manager 21 locates the appropriate inode for the data object which is the target of the request. This can be done by a simple mapping of the file handle in the request to an inode number. Also at 704, the storage manager 21 loads into memory (if not already present in memory) the alignment map 46 of the target data object and uses the alignment map 46 and the LSA to determine the corresponding PSA. As noted above, the alignment map 46 can be stored in memory as a BBT, in which case the PSA value is located by using the well-known algorithm for locating data in a BBT, using the LSA as lookup key.

At 705 the storage manager 21 sends a read request including the PSA to the lower layers of the storage operating system 20 on the PPS subsystem side, including RAID layer 24, which access the PPS subsystem 4 in the usual manner using the provided PSA. At 706 the storage manager 21 subsequently receives the result of the request from the RAID layer 24 (e.g., the requested data or an acknowledgment) and forwards that result back to the network layers (e.g., protocol layer 22), for return to the requesting client.

Note that while the alignment map and associated technique are described here in the context of a read request, they can also be employed in a similar manner in the servicing of write requests.

Figure 8:
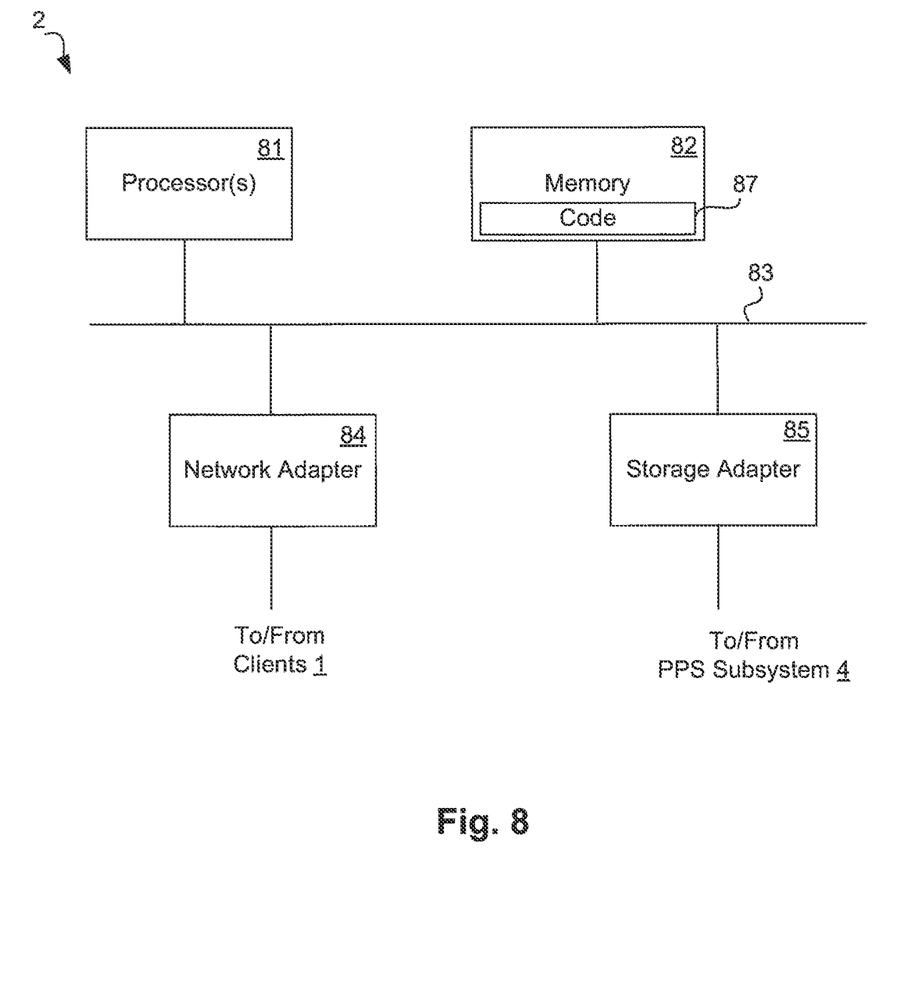
FIG. 8 is a high-level block diagram showing the hardware architecture of a storage server.

FIG. 8 is a high-level block diagram showing an example of the architecture of the hardware of storage server 2, in which the technique described above can be implemented. In the illustrated embodiment, the storage server 2 includes one or more processors 81 and memory 82 coupled to an interconnect 83. The interconnect 83 shown in FIG. 8 is an abstraction that represents any one or more separate physical buses, point-to-point connections, or both, connected by appropriate bridges, adapters, or controllers. The interconnect 83, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 81 is/are the central processing unit (CPU) of the storage server 2 and, thus, control the overall operation of the storage server 2. In certain embodiments, the processor(s) 81 accomplish this by executing software or firmware stored in memory 82. The processor(s) 81 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 82 is or includes the main memory of the storage server 2. The memory 82 represents any form of random access memory (RAM), read-only memory (ROM), flash memory, or the like, or a combination of such devices. In use, the memory 82 may contain, among other things, code 87 embodying the storage operating system 20.

Also connected to the processor(s) 81 through the interconnect 83 are a network adapter 84 and a storage adapter 85. The network adapter 84 provides the storage server 2 with the ability to communicate with remote devices, such as clients 1, over the interconnect 83 and may be, for example, an Ethernet adapter or Fibre Channel adapter. The storage adapter 85 allows the storage server 2 to access the PPS subsystem 4 and may be, for example, a Fibre Channel adapter or SCSI adapter.

Note that while the above-described mapping technique is described above as being implemented in a storage server, in other embodiments it could be implemented in a different type of storage device, such as in a disk drive or another type of mass storage device.

The techniques introduced above can be implemented by programmable circuitry programmed or configured by software and/or firmware, or entirely by special-purpose circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, special-purpose hardwired circuitry, software and/or firmware in conjunction with programmable circuitry, or a combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method, comprising:
    storing an image file that represents a virtual disk and includes a plurality of logical blocks, each of the logical blocks representing a corresponding physical block stored on a physical storage medium, wherein a size of metadata of the virtual disk is not an integer number of physical blocks of the physical storage medium and causes starting offset misalignments between the logical blocks and the corresponding physical blocks on the physical storage medium; and
    servicing a data access request in the storage device by reading one of the logical blocks in its entirety with only a single read operation to the physical storage medium.

2. A method as recited in claim 1, wherein the storage device is a network storage server.

3. A method as recited in claim 1, wherein the storage device is a mass storage device.

4. A method as recited in claim 1, wherein servicing the data access request comprises:
    using an alignment data structure to map a start location of one of the logical blocks to a corresponding start location of one of the physical blocks in response to the data access request.

5. A method as recited in claim 4, wherein the alignment data structure represents a mapping such that a region on the physical storage medium is not mapped to any logical block, said region being located between and contiguous with two other regions on the physical storage medium that are mapped to logical blocks.

6. A method as recited in claim 5, wherein the region comprises a disk sector.

7. A method as recited in claim 5, further comprising using the region to store system information which is not visible to a storage client.

8. A method as recited in claim 4, wherein the alignment data structure represents a mapping such that a plurality of regions on the physical storage medium are each not mapped to any logical block, each said region being located between and contiguous with two other regions on the physical storage medium that are mapped to logical blocks.

9. A method as recited in claim 8, wherein each of the plurality of regions is a disk sector.

10. A method as recited in claim 8, further comprising using at least one of the regions to store system information which is not visible to a storage client.

11. A method as recited in claim 4, wherein the alignment data structure is stored in, or referenced by, an inode of a data object that contains the logical blocks.

12. A method, comprising:
    receiving at a network storage server, from a storage client, a request for accessing data of an stored data object that represents a virtual disk, the data being stored as a plurality of physical data blocks on a physical storage medium accessible to the network storage server, the plurality of physical data blocks being represented in the network storage server as a plurality of logical data blocks, wherein a size of metadata of the virtual disk is not an integer number of physical blocks of the physical storage medium and causes starting offset misalignments between the logical data blocks and the corresponding physical data blocks on the physical storage medium; and
    in response to the request,
        determining a starting sector value for the request;
        identifying an inode of the data object;
        using the inode to locate an alignment data structure for the data object, the alignment data structure containing a plurality of storage medium sector values;
        using the alignment data structure to map the starting sector value for the request to a new sector value representing a physical start address of the data; and
        using the new sector value to access the data object on the physical storage medium.

13. A method as recited in claim 12, wherein a sector on the physical storage medium is not mapped to any logical data block.

14. A method as recited in claim 13, further comprising using the sector to store system information which is not visible to a storage client.

15. A method as recited in claim 13, wherein the alignment data structure is stored in, or referenced by, an inode of the data object.

16. A network storage server, comprising:
    a network interface through which to receive a data access request from a storage client;
    a storage interface through which to access a mass storage subsystem which includes a physical storage medium;
    a storage manager to store an image file that represents a virtual disk and includes a plurality of logical blocks, each of the logical blocks representing a corresponding physical block stored on the physical storage medium, wherein a size of metadata of the virtual disk is not an integer number of physical blocks of the physical storage medium and causes starting offset misalignments between the logical blocks and the corresponding physical blocks on the physical storage medium; and a mapping unit to use an alignment data structure to map a start location of one of the logical blocks to a corresponding start location of one of the physical blocks in response to the data access request;

wherein the storage manager further stores information that is not visible to the storage client in a region of the physical storage medium that is not mapped to the plurality of logical blocks.

17. A network storage server as recited in claim 16, wherein the storage manager uses the mapping unit to service a data access request by reading one of the logical blocks in its entirety with only a single read operation to the physical storage medium.

18. A network storage server as recited in claim 16, wherein the alignment data structure represents a mapping such that a region on the physical storage medium is not mapped to any logical block, said region being located between and contiguous with two other regions on the physical storage medium that are mapped to different logical blocks.

19. A network storage server as recited in claim 16, wherein servicing data access requests comprises:

reading one of the logical blocks which is not aligned with the corresponding physical block, in its entirety, by using only a single read operation to the physical storage medium.

20. A network storage server as recited in claim 16, wherein the alignment data structure is stored in, or referenced by, an inode of a data object that contains the logical blocks.

* * * * *